J. JANGGEN.
SPACING DEVICE.
APPLICATION FILED JUNE 7, 1915.
1,178,726.
Patented Apr. 11, 1916.
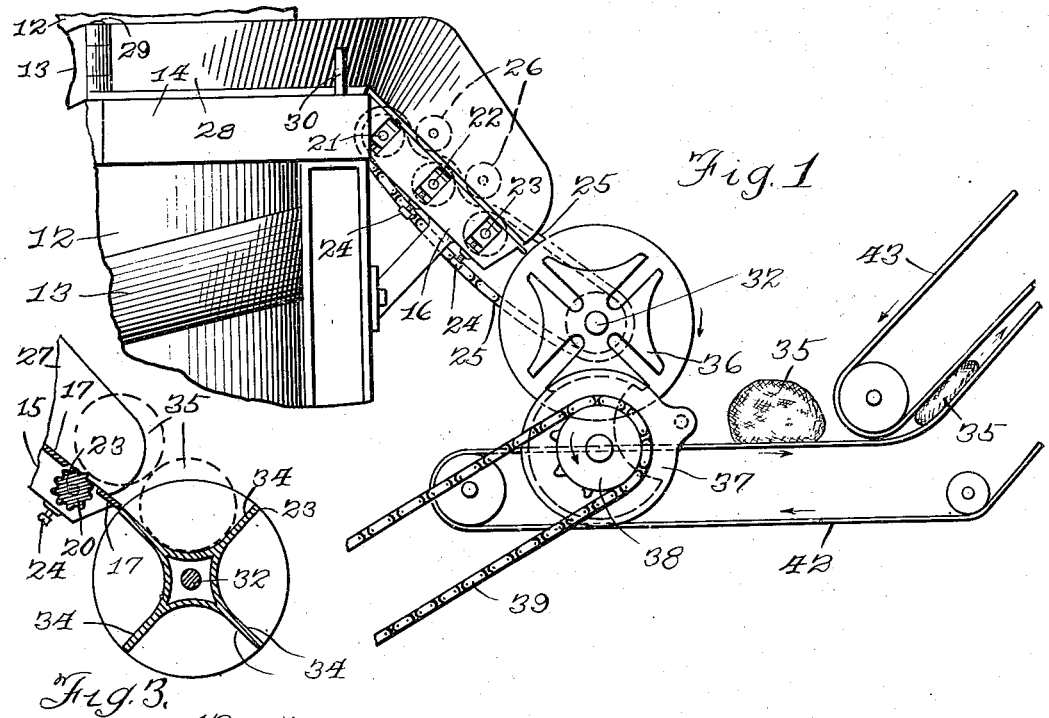
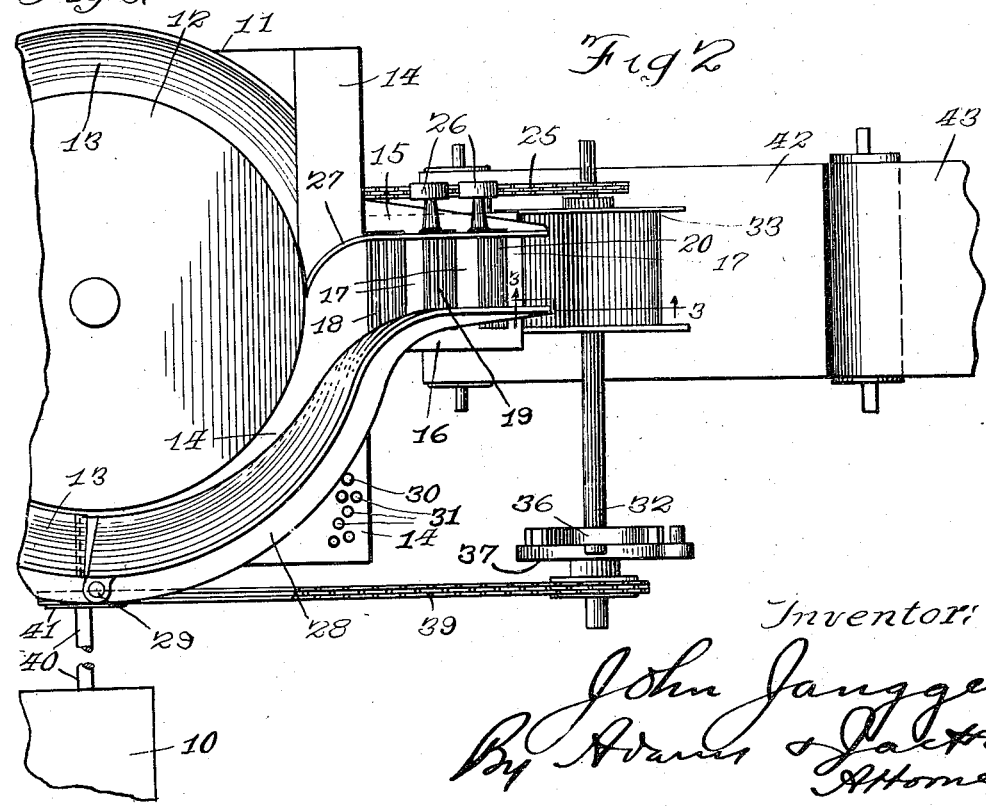
Inventor:
John Janggen
By Adams & Jackson
Attorneys.

UNITED STATES PATENT OFFICE.

JOHN JANGGEN, OF CHICAGO, ILLINOIS.

SPACING DEVICE.

1,178,726.  Specification of Letters Patent.  Patented Apr. 11, 1916.

Application filed June 7, 1915. Serial No. 32,600.

*To all whom it may concern:*

Be it known that I, JOHN JANGGEN, a citizen of the United States, and a resident of Chicago, in the county of Cook and State of Illinois, have invented certain new and useful Improvements in Spacing Devices, of which the following is a specification, reference being had to the accompanying drawings.

My invention relates to spacing devices adapted to regulate the delivery of pieces of dough from dividing and rounding mechanism to a proofing or a molding device. For a proper handling of the pieces of dough in the proofer, and also as such pieces of dough emerge from the molder after the proofing process, it is highly important that the separate pieces of dough advance at as nearly regular intervals as it is possible to attain. There are dividers upon the market which cut off and start through the train of mechanisms a succession of pieces of dough with approximate regularity. The action of the baller or rounder, however, is not nearly so positive or regular. In this machine, the dough is rolled by a rotary device up an incline, the time taken for this operation very often varying widely for two successively-formed balls. It therefore happens frequently that two balls of dough are delivered from the baller or rounder at almost the same time.

It is the principal object of my invention to provide means for receiving the balls of dough, preferably as they come from the baller, adapted to time their advance to the proofer or other device next in the train of mechanisms.

It is another object of my invention to improve delivery and spacing devices of this type in sundry details hereinafter pointed out.

The preferred means by which I have accomplished my objects are illustrated in the drawings and are hereinafter specifically described.

That which I believe to be new and desire to cover by this application is set forth in the claims.

In the drawings,—Figure 1 is a side view of my improved device as applied between a baller or rounder and the means for delivering the balls to a proofer; Fig. 2 is a top plan view of the parts shown in Fig. 1, but showing also diagrammatically a fragmentary portion of the divider; Fig. 3 is a detail view, being substantially a section on line 3—3 of Fig. 2.

Referring to the several figures of the drawings, in which corresponding parts are indicated by the same reference characters,—10 indicates a portion of a divider of any suitable type adapted to receive a quantity of dough in bulk and to cut off and to forward to the next-succeeding device a succession of equal-sized pieces of dough. Preferably, the pieces of dough cut off by the divider 10 are delivered by suitable devices (not shown) directly to a baller or rounder 11, which also is of any suitable type. The baller shown comprises a rotary cylinder 12 about which extends an inclined trough 13 up which the piece of dough is adapted to be rolled by its engagement with the cylinder 12, being delivered at the upper end of the trough 13 upon a suitable table 14, from which it passes to the spacing device as hereinafter described.

An adjustable chute is provided leading from the table 14 comprising brackets 15—16 supporting between them an inclined plate 17. The plate 17 is provided with laterally-extending slots in which corrugated rollers 18—19—20 are revolubly mounted, such rollers being mounted in the brackets 15—16 by means of shafts 21—22—23, respectively. As is shown in Fig. 1, the shafts 21—22—23 are adjustable up and down relative to the plate 17 by means of set-screws 24 mounted in the brackets 15—16, whereby the rollers 18, 19 and 20 may be caused to protrude as desired more or less above the surface of the plate 17. The shafts 21—22—23 are driven by means of a sprocket-chain 25 which is actuated in the manner hereinafter set forth. Idlers 26 are employed for holding the sprocket-chain 25 in engagement with the sprocket-gears mounted on the shafts 21—22—23 regardless of the vertical adjustment of such shafts. A stationary plate 27 forms one side of the chute, the other side of which is formed by an adjustable member 28 which is pivoted to the upper end of the trough 13 by means of a pin 29. The member 28 is slidable upon the table 14 so as to bring its diagonally-extending lower end to the desired distance from the plate 27, being held in adjusted position by means of a pin 30 adapted to be mounted in any one of a plurality of openings 31 in the table 14.

The means for timing the delivery of the successive pieces of dough so as to cause their advance to be at regular intervals comprises a shaft 32 mounted in any suitable framework (not shown). The shaft 32 has fixedly mounted upon it a rotary fly 33, the vanes of which provide a plurality of suitable pockets 34, each of which pockets is adapted to receive from the baller through the chute above described a single ball of dough 35, as shown in Fig. 3. The pocketed fly 34 and the shaft 32 are adapted to be given successive quick rotary movements through the medium of a Geneva intermittent gear mechanism, as hereinafter described, for throwing the balls of dough successively from the several pockets 34 upon the delivery mechanism leading to the next-succeeding dough-handling device. The Geneva intermittent gear mechanism comprises a slotted disk 36 fixedly mounted upon one end of the shaft 32 and a constantly-driven pin disk 37, the pin-disk 37 being driven by means of a sprocket-gear 38 and a sprocket-chain 39 from a shaft 40 of the divider 10, such shaft being provided with a suitable sprocket-gear 41 for this purpose. The timing of the driven disk 37 relative to the shaft 40 of the divider 10 is such that the pocketed fly 33 is driven in the proper timed relation to the action of the divider 10, the pocketed fly 33 being timed, in the construction shown, so as to be given four intermittent actuations comprising one complete revolution for every four pieces of dough cut off and delivered by the divider 10.

The means for advancing the balls of dough 35 from the fly 33 comprises an endless belt 42 and a second endless belt 43 driven in the opposite direction so as to cause the pieces or balls of dough 35 to be drawn upward between such belts for delivery to the next-succeeding dough-handling device.

By the use of adjustable chute mechanism leading from the baller or rounder 12, the successively-delivered balls of dough 35 are kept in line one behind the other, as shown in Fig. 3, until they are received by the successively-presented pockets 34 of the fly 33. By a very little supervision on the part of the operator who has charge of the divider, baller and proofer, the delivery of the timing device can be made almost invariably uniform and regular. It has been found in practice that very often two or three pieces of dough are lined up in the chute awaiting delivery by the fly as shown in Fig. 3. A few seconds later, for a great variety of reasons, the delivery of the baller will have been slowed up temporarily and the balls 35 will arrive in position barely in time to be received in an empty pocket 34 before its quick rotary movement. In view of the fact that the fly 33 is timed to handle the same number of pieces of dough as are delivered by the divider 10, the fly is capable of handling the balls and forwarding them at regular intervals, regardless of almost any irregularity in the delivery from the divider which occurs in the normal operation of the devices.

By the use of the rollers 18—19—20 the balls 35 are prevented from sticking in the chute when they have become lined up in the chute as shown in Fig. 3. Moreover, the action of the said rollers upon the balls 35 as they are advanced down the chute, has a tendency to keep the balls alive during their wait in the chute, the balls 35 being compelled to rise as they pass over the rollers, the movement of the balls as they pass over the rollers being increased by reason of the provision of the corrugations in the said rolls.

That which I claim as my invention, and desire to secure by Letters Patent, is,—

1. The combination, in a train of dough-handling mechanisms, of a divider adapted to deliver successively a plurality of pieces of dough, a baller adapted to round up said pieces, and means operated in timed relation relative to the divider adapted to handle approximately the same number of pieces as are delivered by the divider to the baller and adapted to correct irregularities in the timing of the advance of the several pieces.

2. The combination of a train of mechanisms adapted to handle a succession of pieces of dough, means for holding temporarily a plurality of pieces of dough, and a rotary device actuated in timed relation relative to the number of pieces handled adapted to hold back temporarily in said holding means any excess of pieces of dough delivered thereto and to forward said pieces of dough at regular intervals therefrom.

3. The combination of a device revolubly mounted on a horizontal axis and provided with a plurality of pockets, means for delivering a piece of dough to each pocket in turn when in its uppermost position, and means for giving said device successive quick rotary movements for throwing the pieces of dough successively at regular intervals from the pockets.

4. The combination of a chute comprising a corrugated roller, a rotary device provided with a plurality of pockets adapted to receive from said chute a plurality of pieces of dough successively in the several pockets, and intermittently-acting means adapted to rotate said roller for assisting in advancing a piece of dough along the chute and at the same time to actuate said rotary device for delivering the pieces of dough therefrom at regular intervals.

5. The combination of a chute comprising a corrugated roller, a shaft revolubly mounted below said chute, a device provided with a plurality of pockets fixed on said shaft, said device being adapted to receive from said chute a plurality of pieces of dough successively in the several pockets, connections between said shaft and said roller for driving said roller from said shaft, and a Geneva intermittent gear mechanism for giving said shaft successive quick rotary movements serving to deliver the pieces of dough successively at regular intervals from the pockets.

JOHN JANGGEN.